United States Patent
Circenis et al.

(10) Patent No.: US 7,146,496 B2
(45) Date of Patent: *Dec. 5, 2006

(54) METHODS AND APPARATUS FOR MANAGING TEMPORARY CAPACITY IN A COMPUTER SYSTEM

(75) Inventors: Edgar I. Circenis, Loveland, CO (US); Bradley A. Klein, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 644 days.

This patent is subject to a terminal disclaimer.

(21) Appl. No.: 10/350,660

(22) Filed: Jan. 23, 2003

(65) Prior Publication Data

US 2004/0148498 A1 Jul. 29, 2004

(51) Int. Cl.
*G06F 9/00* (2006.01)
*G06F 15/177* (2006.01)

(52) U.S. Cl. .......................... 713/100; 713/1
(58) Field of Classification Search ............ 713/1, 713/100
See application file for complete search history.

(56) References Cited

U.S. PATENT DOCUMENTS

| | | | | |
|---|---|---|---|---|
| 5,717,604 | A * | 2/1998 | Wiggins | 709/229 |
| 5,815,807 | A * | 9/1998 | Osmani et al. | 455/410 |
| 6,453,344 | B1 * | 9/2002 | Ellsworth et al. | 709/220 |
| 6,499,035 | B1 * | 12/2002 | Sobeski | 707/103 R |
| 2002/0161990 | A1 * | 10/2002 | Zhang et al. | 713/1 |
| 2003/0088516 | A1 * | 5/2003 | Remer et al. | 705/59 |
| 2004/0148229 | A1 | 7/2004 | Maxwell | |
| 2004/0148394 | A1 * | 7/2004 | Circenis et al. | 709/226 |

FOREIGN PATENT DOCUMENTS

| | | |
|---|---|---|
| DE | 10007599 | 3/2001 |
| GB | 2391975 | 2/2004 |

OTHER PUBLICATIONS

HP introduces instant capacity on demand solutions offering Australian E-services customers immediate additional server capacity, Hewlett Packard Corporation, Nov. 16, 1999, pp. 1-3.*
Hewlett-Packard QuickSpecs, "HP Instant Capacity on Demand (iCOD) Solutions" downloaded from http://h18002.www1.hp.com/products/quickspecs/11723_div/11723_div.html, May 24, 2004.
UK Search Report mailed May 24, 2004 re App No. GB0400020.4.
U.S. Appl. No. 10/351,128; Filed on Jan. 23, 2003; Inventors; Circenis et al.; Attorney Docket No. 200208237-1.
Office Action of U.S. Appl. No. 10/351,128 dated Mar. 28, 2006.

* cited by examiner

*Primary Examiner*—Dennis M. Butler

(57) ABSTRACT

A method for activating a set of previously inactive components in a computer system is disclosed. The method includes receiving a request for activating the set of previously inactive components and ascertaining whether there exists a first right for activating the set of previously inactive components. The method further includes activating the set of previously inactive components in accordance with the first right if the first right exists. The method additionally includes ascertaining, if there is no first right for activating the previously inactive component, whether there exists temporary capacity availability adequate to support the activating the set of previously inactive components, the temporary capacity availability being tracked at the computer system and representing a duration that a component having the same type as components in the set of previously inactive components can be activated in the absence of the first right for activating the set of previously inactive components. The method also includes activating the set of previously active components if the temporary capacity availability adequate to support activating the set of previously inactive components exists.

45 Claims, 5 Drawing Sheets

METHODS AND APPARATUS FOR MANAGING TEMPORARY CAPACITY IN A COMPUTER SYSTEM

This patent application relates to a commonly assigned patent application entitled "Methods And Apparatus For Managing The Execution Of A Task Among A Plurality Of Autonomous Processes," by inventors Edgar I. Circenis and Bradley A. Klein U.S. Pat. No. 10/351,071, and a commonly assigned patent application entitled "Methods And Apparatus For Rapidly Activating Inactive Components In A Computer System," by inventors Edgar I. Circenis and Bradley A. Klein U.S. Pat. No. 10/351,128, all of which are filed on even date herewith and incorporated herein by reference.

BACKGROUND OF THE INVENTION

ICOD (Instant Capacity On Demand) systems are computer systems that typically include one or more inactive components (known as ICOD components) when shipped to the user. As the term is employed herein, an inactive or ICOD component is a software or hardware component that the user has not paid for and is not entitled to use as a matter of right.

Vendors include inactive or ICOD components in a computer system for many reasons. For example, a vendor may anticipate that a particular user may need additional software and/or hardware capability in the future and may wish to include the additional capability in an inactive form so that the additional capability can be quickly enabled at a later date if needed. The ICOD components may be processors, memory, cells, subsystems, or the like, and can be activated when the user wishes to obtain additional capability from the ICOD system.

Generally speaking, when an ICOD system is shipped to a user, either the vendor or the customer will deactivate the inactive components so that only the components that have been paid for will be active during use. This deactivation may happen one time prior to shipping, or the ICOD system may include software to automatically deactivate the inactive components upon system booting based on the licensing data stored in the ICOD system itself.

To ensure compliance, vendors in the past employ an ICOD software agent, e.g., codes in the ICOD system, to periodically take inventory of the inactive (or active) components and compare the number of inactive (or active) components with the licensing data stored in non-volatile memory. The data regarding the number of inactive (or active) components, along with other identification information such as the serial number of the computer system, the host name, the IP address, and the like may then be sent in an email to the vendor to allow the vendor to audit for compliance.

If a user's computer system uses more active components therein than the number of active components allowed under license, the user's system is deemed to be in a non-compliant state, and the vendor may undertake any number of corrective actions. For example, the vendor may wish to send a sales representative to the user whose system is found to be in a non-compliant state in order to suggest the licensing of the activated components. As another example, the vendor may notify the user of the non-compliant status and request that the user either immediately pay for the use of the inactive components, or to cease the non-compliant use.

An exception to the above exists when the user has purchased temporary capacity with the vendor. In general, if the user maintains an adequate temporary capacity account with the vendor, the user can activate ICOD components temporarily and have the temporary capacity balance deducted for the ICOD component usage. Thus, as long as the user has an adequate temporary capacity available, the user can temporarily activate a greater number of components than that allowable under license. With the temporary capacity feature, users benefit from having the flexibility of being able to temporarily activate components to handle any unexpected and/or temporary need for additional capacity without having to commit in advance to a long term purchase. Vendors also benefit since the sale of temporary capacity represents an additional revenue stream for the vendors.

Traditionally, the customer's temporary capacity account is tracked by the vendor. On a periodic basis, the ICOD software agent sends data regarding the number of components active in the user's computer system to vendor. The data may be transmitted in an email via the Internet, for example. The vendor's auditing system then calculates the number of components activated in excess of that allowable under license as well as the amount of temporary capacity consumed in order to adjust the user's temporary capacity balance.

To facilitate discussion, FIG. 1 illustrates a simplified exemplary ICOD system 100 having four CPUs 102, 104, 106, and 108. In the example of FIG. 1, CPUs 102 and 104 represent licensed CPUs, i.e., CPUs that the user has already paid for and is entitled to use as a matter of right. CPUs 106 and 108 represent ICOD CPUs, which are normally deactivated in ICOD system 100.

An ICOD software agent 110 is provided to enable user 112 to activate and deactivate the CPUs, via a terminal 114, to meet the user's capacity demand. On a periodic basis, e.g., every 24 hours, ICOD software agent 110 takes an inventory of the number of CPUs active in ICOD system 100 and sends an email to the vendor's audit system 116 via a network 117 to facilitate auditing. Audit system 116 includes an audit database 118, which stores the licensing information for the various ICOD systems sold by the vendor. For example, audit database 118 may track the serial number of a particular ICOD system, such as ICOD system 100, along with the number of ICOD CPUs therein (e.g., the two CPUs 106 and 108 in the present example). Audit database 118 also tracks a temporary capacity balance (shown by reference number 120) for ICOD system 100.

If ICOD system 100 is found to have a greater number of CPUs activated than that allowed under license, audit system 116 debits the temporary capacity balance for ICOD system 100. For example, if 3 CPUs are active per the audit email from ICOD software agent 110, ICOD system 100 is deemed to have 1 ICOD CPU activated (3 minus the two allowed under license). Since the audit email is received once every 24 hours, 24 CPU-hours (1 CPU times 24 hours) may be deducted from the temporary capacity balance for ICOD system 100.

If the temporary capacity balance drops below a certain threshold, auditing system 116 may, for example, send an email to the user to inform the user of the low temporary capacity balance and/or to request that the user replenish the temporary capacity account. This is represented by arrow 122 in FIG. 1. The user may replenish the temporary capacity account by making a purchase of additional temporary capacity units from the vendor, for example.

There are, however, disadvantages associated with the arrangement of FIG. 1. For example, the fact that the temporary capacity account is kept only at the vendor renders it difficult for ICOD software agent 110 to take enforcement action based on an insufficient temporary capacity balance. In ICOD system 100 of FIG. 1, ICOD software agent 110 has no knowledge of the temporary capacity and therefore cannot initiate enforcement action based on an insufficient temporary capacity.

Although audit system 116 can send emails to request the user to purchase additional temporary capacity units to address a negative temporary capacity balance, for example, some users may simply ignore such a request while continuing to utilize the non-compliant ICOD components. In this case, the vendor may eventually need to resort to sending field service personnel to the user's site to disable and/or remove the ICOD components. Additionally or alternatively, the vendor may need to resort to legal action to collect payment for the ICOD component usage and/or to repossess the computer system.

Furthermore, since the temporary capacity account is kept only with auditing system 116, the only way the user could find out about his temporary capacity availability is by contacting the vendor and asking for the temporary capacity balance data. If there is a delay in collecting and processing the temporary capacity account data at the vendor's auditing system and/or in processing the user's request, it may be some time before the user receives data regarding his own temporary capacity balance. During the delay, additional temporary capacity may have been consumed, rendering the received temporary capacity data untrustworthy. Without the ability to receive the temporary capacity balance information in an accurate and timely manner, it may be difficult for the user to forecast and plan for future capacity usage.

Furthermore, the auditing and enforcement mechanisms in FIG. 1 depend on the existence of email connectivity between ICOD system 100 and auditing system 116. It has been found, however, that many users are reluctant to endow their production ICOD systems with an email infrastructure, and to risk exposing their ICOD computer systems to the security risks that accompany email access. For some users, even the exposure of the host name to the outside world is unacceptable. For these users, the vendor has no visibility as to the number of ICOD components activated, and thus no reasonable way of tracking of the temporary capacity balance.

SUMMARY OF THE INVENTION

The invention relates, in one embodiment, to a method for activating a set of previously inactive components in a computer system. The method includes receiving a request for activating the set of previously inactive components and ascertaining whether there exists a first right for activating the set of previously inactive components. The method further includes activating the set of previously inactive components in accordance with the first right if the first right exists. The method additionally includes ascertaining, if there is no first right for activating the previously inactive component, whether there exists temporary capacity availability adequate to support activating the set of previously inactive components, the temporary capacity availability being tracked at the computer system and representing a duration that a component having the same type as components in the set of previously inactive components can be activated in the absence of the first right for activating the set of previously inactive components. The method also includes activating the set of previously inactive components if the temporary capacity availability adequate to support activating the set of previously inactive components exists.

In yet another embodiment, the invention relates to an article of manufacture comprising a program storage medium having computer readable codes embodied therein, the computer readable codes being configured for activating a set of previously inactive components in a computer system. The article of manufacture includes computer readable codes for receiving a request for activating the set of previously inactive components. The article of manufacture includes computer readable codes for ascertaining whether there exists a first right for activating the set of previously inactive components. The article of manufacture includes computer readable codes for activating, if the first right exists, the set of previously inactive components in accordance with the first right. The article of manufacture includes computer readable codes for ascertaining, if there is no first right for activating the previously inactive component, whether there exists temporary capacity availability adequate to support activating the set of previously inactive components, the temporary capacity availability being tracked at the computer system and representing a duration that a component having the same type as components in the set of previously inactive components can be activated in the absence of the first right for activating the set of previously inactive components. The article of manufacture additionally includes computer readable codes for activating the set of previously active components if the temporary capacity availability adequate to support activating the set of previously inactive components exists.

In yet another embodiment, the invention relates to a method for enabling a computer system to allow a user to activate a previously inactive component in the computer system. The method includes providing computer readable codes for installation on the computer system. The computer readable codes, after being installed on the computer system, enable the computer system to receive a request for activating the previously inactive component and to ascertain whether there exists an acquired right for activating the previously inactive components. The computer readable codes, after being installed on the computer system, further enable the computer system to ascertain, if there is no acquired right to activate the previously inactive component, whether there exists temporary capacity to support activating the previously inactive component and to activate the previously inactive component if there exists temporary capacity to support activating the previously inactive component.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

To facilitate discussion.

DETAILED DESCRIPTION OF THE PREFERRED EMBODIMENTS

Figure 1:
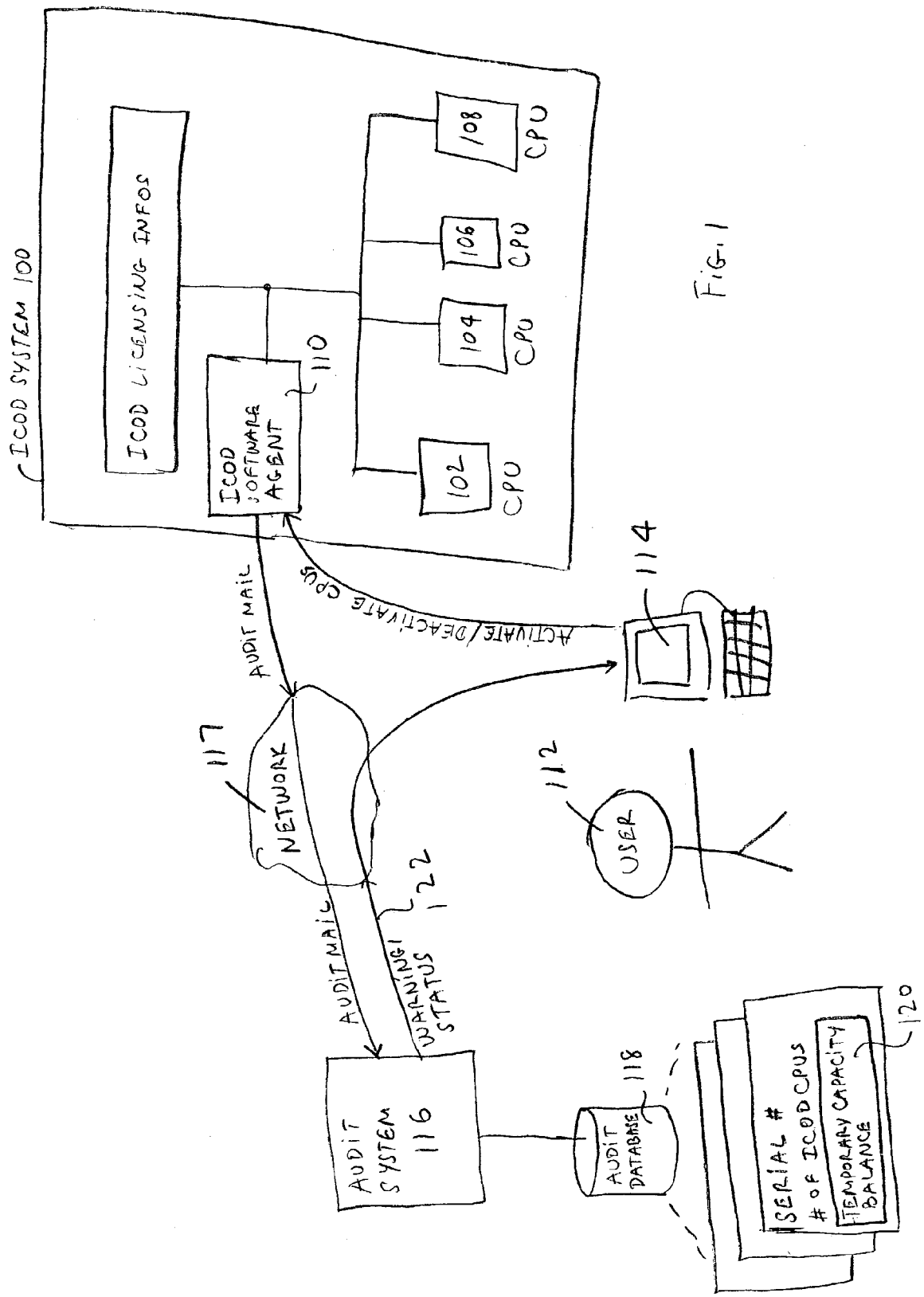
FIG. 1 illustrates a simplified exemplary ICOD computer system having four CPUs.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one embodiment of the present invention, there are provided improved techniques for managing temporary capacity in an ICOD computer system. The inventive temporary capacity management techniques improve user accountability as well as provide a mechanism to timely and accurately furnish the user with temporary capacity information when queried. Furthermore, the inventive temporary capacity management techniques advantageously do not depend on the existence of an email infrastructure or network connectivity in the ICOD computer system.

In one embodiment, the temporary capacity balance is kept in nonvolatile memory (e.g., semiconductor nonvolatile memory or a file on a disk) of the ICOD computer system. The user can purchase or replenish the temporary capacity by contacting the vendor using, for example the vendor's website or portal, the telephone or by any other telecommunication or communication means. To purchase temporary capacity, the user may furnish his identification information, the computer system identification information, the amount of temporary capacity desired, and/or any payment information in order to receive a codeword from the vendor. Note that the term "vendor" is employed generically herein to denote the entity responsible for supporting the user and is not necessarily limited to (although the term may include) the manufacturer of the computer system, the distributor, the dealer, the contract servicing organization, or any other entity responsible for ensuring that the user can obtain additional temporary capacity if needed.

The user can then apply the received codeword to the ICOD computer system (by entering the codeword into the computer system, for example) to increase the amount of temporary capacity available. Once there is an adequate temporary capacity, the user can activate the inactive ICOD components and have the temporary capacity balance debited for usage of components in excess of the number of components allowable under the acquired right.

As the term is employed herein, the number of components allowable under the acquired right denotes the number of components that the user has already paid for and/or is entitled to use as a matter of right. In contrast, ICOD components are components that the user has not paid for and/or is not entitled to use as a matter of right. ICOD components can be activated temporarily if the user obtains some temporary right or provisional license thereto, such as by maintaining a temporary capacity balance or by obtaining a pending right.

Advantageously, there is no need to furnish the ICOD computer system with an email infrastructure or network connectivity in order to allow the user to benefit from having the temporary capacity feature. As mentioned, the codeword may be obtained using any communication method, including any internet terminal, networked PDA, or even through the telephone via facsimile. As pointed out earlier, this aspect is critical for users who object to exposing their production ICOD computer systems to the risks that accompany email access and/or network connectivity.

The temporary capacity can be accounted for using various denominations such as CPU-hours, gigabyte-days (for memory or disk usage), cell-minutes (for cell usage), and the like. In one embodiment, the temporary capacity balance may be tracked using a universal unit, and appropriate conversion rates may apply to convert the universal temporary capacity balance units into appropriate component units depending on which type of inactive component the user wishes to activate. For example, a given ICOD system may have a balance of 20 temporary capacity units, which may translate into 40 CPU-hours or 60 gigabyte-days.

Since the temporary capacity account is kept locally on the ICOD system, the user can obtain timely and accurate temporary capacity information, including for example the current temporary capacity balance, whether any temporary capacity is being consumed, the current rate of temporary capacity consumption (if any), and the projected expiration time given the current temporary capacity balance and the current rate of consumption. The temporary capacity information may be furnished to the user on demand (e.g., when the user enters a query command at the ICOD system), upon ICOD system reboot, or upon activation/deactivation of components.

Periodically, the ICOD software agent takes an inventory of the number of components currently active on the ICOD system and compares the number of components currently active with the number of active components allowable under the acquired right. If the number of components currently active in the computer system exceeds the number allowable under the acquired right, the temporary capacity consumption rate is calculated, and the temporary capacity account is debited.

For example, consider an ICOD system with 8 CPUs, of which only 3 CPUs may be active under the acquired right. Further, suppose that there is a temporary capacity balance that is equivalent to 40 CPU-hours, and the ICOD software agent is scheduled to take inventory of the active CPUs every hour. If the ICOD software agent found 7 CPUs active instead in the ICOD system, the number of ICOD CPUs (i.e., excess CPUs) employed is 4. In this case, the temporary capacity rate of consumption is 4 CPU-hours/hour, and the ICOD software agent may debit 4 CPU-hours from the current temporary capacity balance of 40 CPU-hours. Further, the ICOD software agent may inform the user that at the current rate of consumption, the temporary capacity balance will be exhausted in 10 hours.

Since the ICOD software agent is aware of the temporary capacity balance, the ICOD software agent may also take enforcement actions based on the temporary capacity availability. If the temporary capacity balance drops below a certain threshold, for example, the ICOD software agent may begin to issue warnings and may escalate to enforcement actions if necessary. Note that since these warnings and notifications are issued from the ICOD system itself, they are more likely to be noticed and heeded by the user than those arriving via emails as in the case with the prior art.

For example, when the temporary capacity balance drops below a certain threshold, the ICOD software agent may request that the user purchase additional temporary capacity or that the user acquire additional components under an acquired right basis. Additionally or alternatively, the ICOD software agent may reconfigure the ICOD system so that the ICOD components are deactivated immediately. Alternatively, the ICOD software agent may reconfigure the ICOD computer system so that the ICOD components are deactivated upon reboot. Additionally or alternatively, the ICOD software agent may reconfigure the ICOD system so as to prohibit the activation of the ICOD components.

Figure 2:
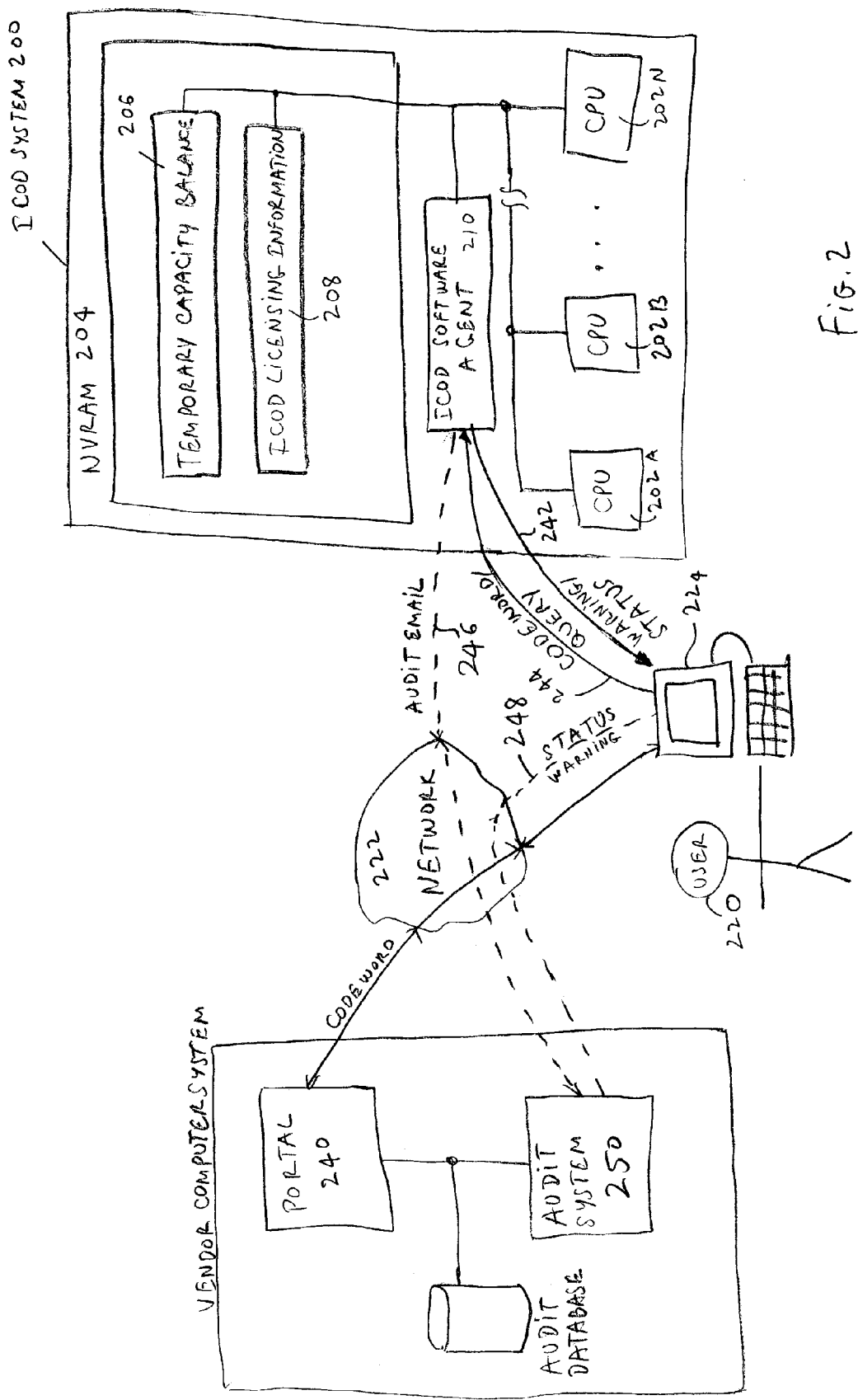
FIG. 2 illustrates, in accordance with one embodiment of the present invention, an ICOD system implementing the temporary capacity feature.

These and other features and advantages of the present invention may be better understood with reference to the drawings and figures that follow. To illustrate, FIG. 2 shows an ICOD system 200 having a plurality of CPUs 202A–202N, some of which represent ICOD CPU components. In the example of FIG. 2, CPUs are employed to represent ICOD components. It should be kept in mind, however, that different types of ICOD components, both software and hardware, may exist in any given ICOD computer system.

FIG. 2 also shows a nonvolatile memory NVRAM 204, representing the memory location for tracking both the temporary capacity account (via temporary capacity balance 206) and ICOD licensing information 208. ICOD licensing information 208 may include information such as the total number of CPUs in ICOD computer system 200, the number of CPUs subject to the acquired right, the number of ICOD CPUs, and identification data regarding the ICOD computer system.

An ICOD software agent 210 is shown coupled to the CPUs and NVRAM 204. On a periodic schedule, e.g., every 30 minutes, ICOD software agent 210 may wake up and take inventory of the number of CPUs activated (or inactive). If the number of active CPUs exceeds the number of CPUs allowable under the acquired right, ICOD software agent 210 will note that the system is out of compliance in accordance with the acquired right and begins to debit temporary capacity balance 206 if there is temporary capacity available. If there is an insufficient temporary capacity to support the number of components currently being activated, ICOD software agent may begin to issue notifications and/or to take enforcement action.

For example, suppose that ICOD computer system 200 has a total of 8 CPUs. If the information in ICOD licensing information 208 indicates that only 3 CPUs should be active under the acquired right but ICOD software agent 210 found 7 CPUs active instead in ICOD system 200, the number of ICOD CPUs (i.e., excess CPUs) employed is 4. In this case, ICOD software agent 210 may debit 2 CPU-hours (4 ICOD CPUs multiplied by a time period of 30 minutes per each rotation of the periodic schedule) from temporary capacity balance 206. The information regarding the compliance state of ICOD system 200, as well as the current temporary capacity balance may then be sent by ICOD software agent 210 to a user 220 at terminal 224.

To increase the temporary capacity balance 206, user 220 may contact a portal 240 via terminal 224 and a network 222 to apply for a codeword. As mentioned before, user 220 may enter identification information such as the serial number of ICOD computer system 200, the amount of temporary capacity user 220 wishes to purchase, any payment data, and receives from portal 240 a codeword that user 220 can apply to ICOD system 200. Preferably, the codeword received is in an ASCII format or another suitable format that the user can input into ICOD software agent 210 (path 244), by for example typing the codeword into terminal 224 or by using a cut-and-paste method.

Note that in the example of FIG. 2, ICOD computer system 200 has only one operating system and one set of CPUs, thereby simplifying the task of periodically adjusting the global temporary capacity balance. When the ICOD computer system is implemented as a partitionable computer system, there may be multiple ICOD software agents executing autonomously on various partitions of the partitionable ICOD computer system. Techniques for managing the global temporary capacity balance and for sending a single notification to the user when there are multiple autonomously executing ICOD software agents present are discussed in the aforementioned co-pending patent application entitled "Methods And Apparatus For Managing The Execution Of A Task Among A Plurality Of Autonomous Processes."

At any time, user 220 may enter a query command and be furnished with data regarding the current temporary capacity balance, whether temporary capacity is being consumed, the temporary capacity consumption rate, and/or the projected expiration of temporary capacity based on the current temporary capacity balance and the current temporary capacity consumption rate. If temporary capacity balance 206 falls below a certain threshold, ICOD software agent 210 may begin to issue warnings (arrow 242) to user 220 via terminal 224.

Note that neither an email facility nor network connectivity is required to provide the temporary capacity feature in accordance with embodiments of the present invention. As mentioned earlier, some customers strongly prefer to isolate their ICOD computer systems from emails and/or network connectivity. On the other hand, the presence of an email facility or network connectivity, if such happens to be present on the ICOD computer system, may furnish the vendor with a backup auditing capability.

As before, ICOD software agent 210 may send an email or a message (via dotted line 246 to denote an optional path) that contains the identification information of the ICOD computer system, the number of active components and/or the temporary capacity balance on the ICOD computer system. Since the codeword to increase the temporary capacity balance is applied for with the vendor, the vendor would have knowledge of the amount of temporary capacity purchased by the user and may also track the temporary capacity account independently using the information regarding the temporary capacity purchased and any calculated temporary capacity consumption from the periodic audit emails/messages sent by ICOD software agent 210. If fraud is detected and/or if the temporary capacity balance drops below a certain threshold, the vendor auditing system 250 may also issue warnings and request (via dotted line 248 to denote an optional path) that the user take certain corrective actions. In some cases, the vendor auditing system 250 may optionally instruct ICOD software agent 210 (e.g., via a telecommunication link, which may be wired or wireless) to take corrective actions, if such corrective actions become necessary. However, this is optional since many users prefer that their ICOD computer systems be isolated from email access and network connectivity, as mentioned earlier.

Depending on prior arrangement made with the vendor, the temporary capacity balance may expire upon reaching zero for some users. For such a user, the amount of temporary capacity available equals the difference between the current value of the temporary capacity balance and zero. For example, if such a user as a current temporary capacity balance of 40, he has 40 units of temporary capacity available. In some cases, the user is allowed to continue to use any ICOD component(s) already activated until the next time the ICOD computer system is rebooted, even if such continued use causes the temporary capacity balance to become negative. As an example of this situation, the vendor may not wish to anger users who may lose important data if the ICOD components already activated are suddenly turned off when the temporary capacity balance reaches zero. However, when the temporary capacity balance is zero (or negative) for these users, the activation of an additional ICOD component may be prohibited and enforcement actions (e.g., warnings, notifications, and the like) may commence.

For other users, the temporary capacity balance may not expire until it reaches a predefined value, such as a negative value. For example, some users may be deemed sufficiently trustworthy that the vendor may be willing to allow such users to incur a negative temporary capacity balance. Thus for such a user, the amount of temporary capacity available is the difference between the current value of the temporary capacity balance variable and the predefined threshold. For example, if the predefined threshold is −20 and the current temporary capacity balance has a value of 40, that user has 60 units of temporary capacity available for use before his ability to debit the temporary capacity account expires. Thus, if such a user has a temporary capacity balance of −10 units, that user may still activate an additional ICOD component, at least until the temporary capacity balance reaches −20 or below.

When the user purchases additional temporary capacity, the resulting temporary capacity balance will be the sum of the current temporary capacity balance (which may be negative) and the additional temporary capacity units purchased.

Figure 3:
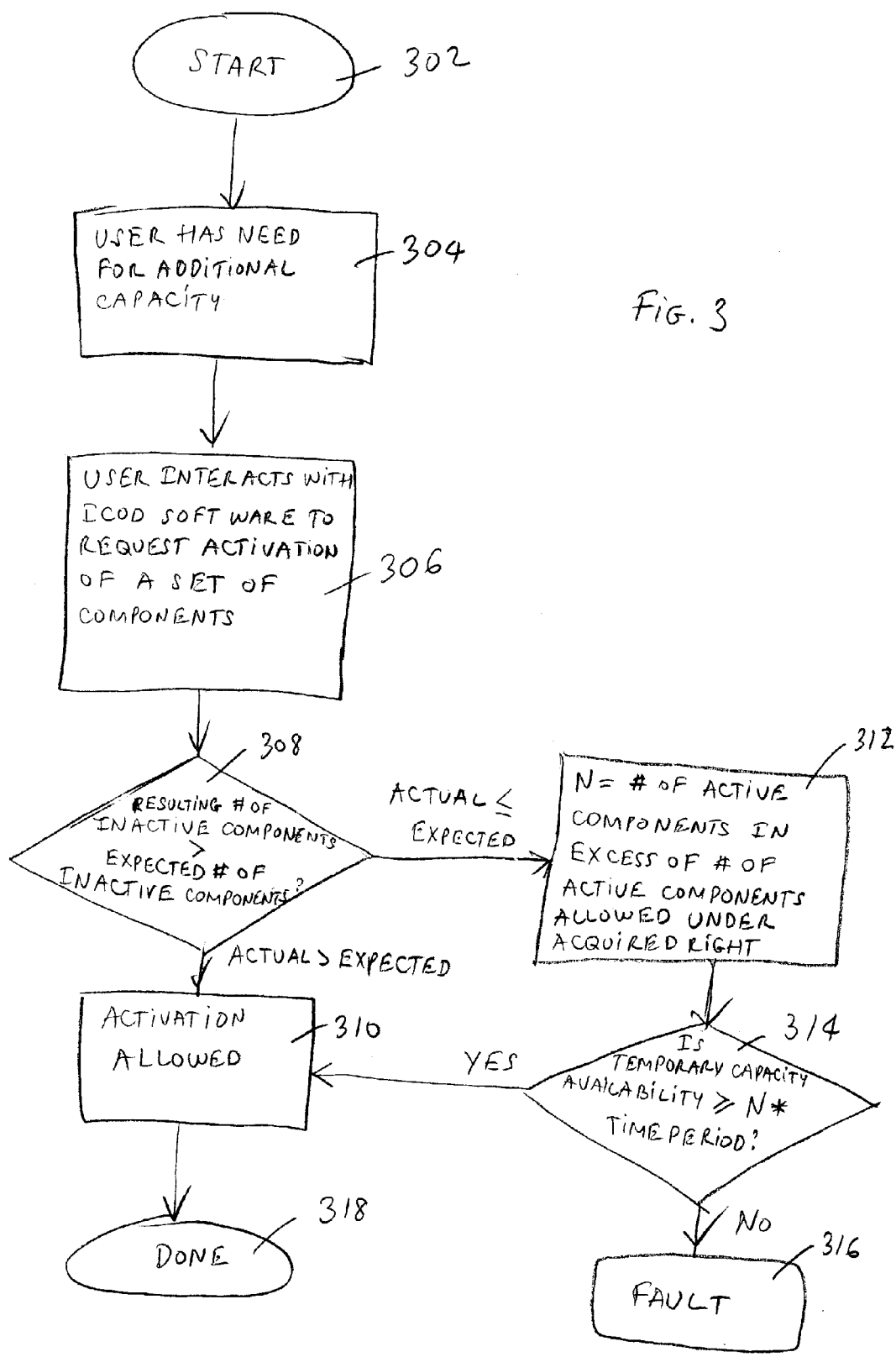
FIG. 3 illustrates, in accordance with one embodiment of the present invention, the steps for activating a set of previously inactive components in a computer system having the temporary capacity feature.

FIG. 3 illustrates, in accordance with one embodiment of the present invention, the steps for activating a set of previously inactive components in a computer system having the temporary capacity feature. In step 304, the user has a need for additional computing capacity. As the term is employed herein, the term "capacity" in the context of additional temporary capacity includes one or both of a greater quantity of a computing functionality already in use (e.g., adding a new CPU to a group of CPUs already in use) and a new computing functionality (e.g., adding a new disk drive for the first time).

In step 306 the user interacts with software in the computer system, e.g., the ICOD software agent in the ICOD computer system, to request the activation of a set of previously inactive components. As the phrase is employed herein, a set of previously inactive components may represent a single previously inactive component (i.e., the set may have only one member) or multiple previously inactive components (i.e., the set may have multiple members).

In step 308, the software in the computer system ascertains whether the number of active components that results from the activation request would exceed the number of active components allowable under the acquired right. In another embodiment, the comparison in step 308 is made by comparing the number of inactive components that would result from the activation request with the number of inactive components expected to be present and inactive in the computer system to comply with the acquired right. Other ways to perform the comparison in step 308 are also possible. If the activation of the set of previously inactive components would not bring the computer system out of compliance under the acquired right, there is no need to employ temporary capacity and activation is allowed in step 310.

On the other hand, if the number of inactive components that would result from the activation request is less than the number of inactive components expected to be present and inactive in the computer system to comply with the acquired right, a further check is made in steps 312 and 314 to ascertain whether there is adequate temporary capacity availability to support the activation request. In step 312, the software in the computer system ascertains number of active components N that would result from the activation request but are not covered by the acquired right. This number of active components N represents the number of components whose activation needs to be supported by the temporary capacity account. In step 314, it is ascertained whether the current temporary capacity available to the user at least equals or exceeds the number of temporary capacity units X required to activate the number of active components N calculated in step 312.

As an example, suppose a computer system has 8 CPUs total, of which only 3 CPUs are covered under the acquired right. Further, suppose that only 2 CPUs are currently active, that there is a current temporary capacity balance of 30 CPU-hours, and that the computer system inventories the number of active (or inactive) CPUs every 30 minutes. If the user requests to activate a total of 7 CPUs, or 5 additional CPUs, only 4 of the 5 additional CPUs in the activation request would count against the temporary capacity account. This is because the user already has the acquired right to activate a total of 3 CPUs, and only 2 CPUs are currently activated, and the user therefore has the right to activate one additional CPU without having to pay out of the temporary capacity account. Thus the value N in step 312 is 4 CPUs.

The number of temporary capacity units X required to activate the number of active components N is therefore 4 CPUs times 30 minutes, or 2 CPU-hours. If the user is not allowed to incur a negative temporary capacity balance, the user has 28 CPU-hours remaining in his temporary capacity availability before the user loses the ability to employ his temporary capacity account to support the activation of additional ICOD components. On the other hand, suppose the user is allowed to incur a negative temporary capacity balance up to, for example, −10 CPU-hours. In this case, the user has 38 CPU-hours remaining in his temporary capacity availability before the user loses the ability to employ his temporary capacity account to support the activation of additional ICOD components.

If there is adequate temporary capacity availability to support the activation of the components in the activation request (as determined in step 314), the temporary capacity balance is optionally adjusted in view of the activation to be granted. In one embodiment, the temporary capacity balance adjustment takes place immediately upon the activation of previously inactive components that are not covered under the acquired right. In another embodiment, the temporary capacity balance is adjusted only during each rotation of the periodic inventory cycle. Activation is then permitted in step 310.

On the other hand, if there is insufficient temporary capacity availability to support the activation request, a fault state is entered (316). In most cases, activation will be denied. If the user has other arrangements, e.g., a pending right to activate the CPUs, activation may be allowed. What takes place in the fault state 316 depends on the business rules of the vendor, the status of the user with the vendor, and/or any other prior arrangements between the vendor and the user.

Figure 4:
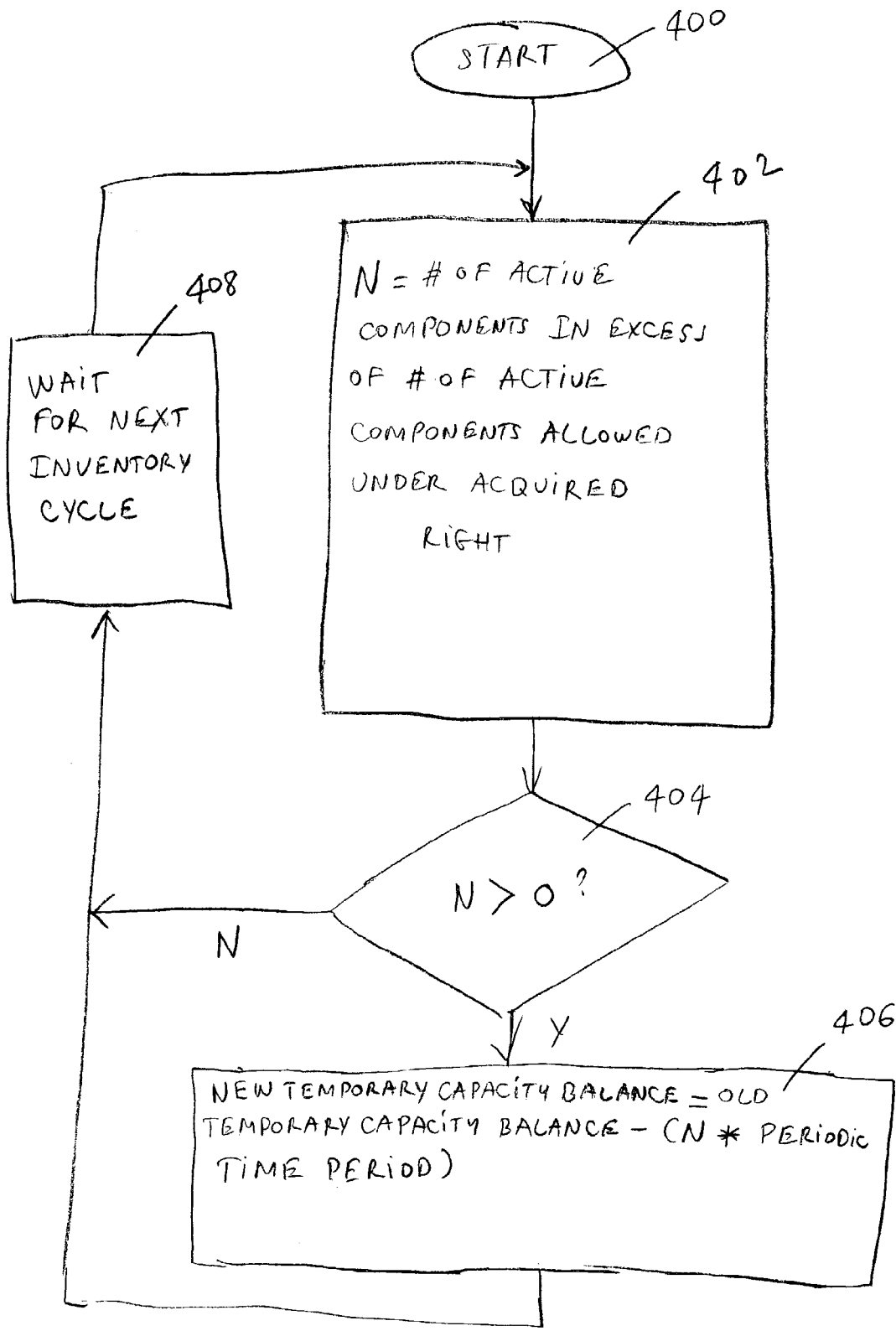
FIG. 4 shows, in accordance with one embodiment of the present invention, the steps for adjusting the temporary capacity balance.

FIG. 4 shows, in accordance with one embodiment of the present invention, the steps for adjusting the temporary capacity balance, e.g., during each rotation of the periodic inventory cycle. In step 402, the software in the computer system ascertains number of currently active components N that are not covered by the acquired right. As mentioned earlier in connection with step 312 of FIG. 3, this number of active components N represents the number of components whose activation needs to be supported by the temporary capacity account. In one embodiment, the number of components N is calculated in accordance to the equation below:

$N$=number of currently active components−(total number of components in system−expected number of inactive components).

For example, suppose that the total number of CPUs in the system is 8 CPUs, and the expected number of inactive components is 5 CPUs to comply with the acquired right. If the number of currently active components is 7 CPUs, N would equal 7−(8−5) or 7−3 or 4 CPUs.

If the value N is less than or equal to zero (as determined in step 404), none of the components in the request needs to be supported by the temporary capacity. This situation may happen if, for example, the total number of currently active components in the computer system is less than or is equal to the number of components covered by the acquired right. In this case, the method of FIG. 3 simply proceeds to step 408 to wait for the next inventory time to arrive.

If the value N is greater than zero (as determined in step 404), i.e., if one or more of the activated components needs to be supported by the temporary capacity, the temporary capacity balance is adjusted in step 406 to account for the activation to be granted. The temporary capacity balance is adjusted in step 406 by subtracting from the current temporary capacity balance the number of temporary capacity units X that is required to support the number of active components N (calculated in step 402).

Continuing the example above, suppose that the system currently has a temporary capacity balance of 30 CPU-hours and the software in the computer system inventories the number of active CPUs every 30 minutes to adjust the temporary capacity balance, the number of temporary capacity units X would be 2 CPU-hours (4 CPUs multiplied by the time period of 30 minutes). The temporary capacity balance value after adjustment is therefore 28 CPU-hours (30 CPU-hours minus 2 CPU-hours).

If the user's computer system is a computer system that has multiple autonomous software agents, only one adjustment to the global temporary capacity balance should take place during a given rotation of the periodic cycle. Techniques for adjusting the global temporary capacity balance only once per rotation of the periodic cycle by multiple autonomously executing software agents are discussed in the aforementioned co-pending patent application entitled "Methods And Apparatus For Managing The Execution Of A Task Among A Plurality Of Autonomous Processes."

After adjusting the temporary capacity balance in step 406, the method proceeds to step 408 to wait for the next inventory time to arrive.

Figure 5:
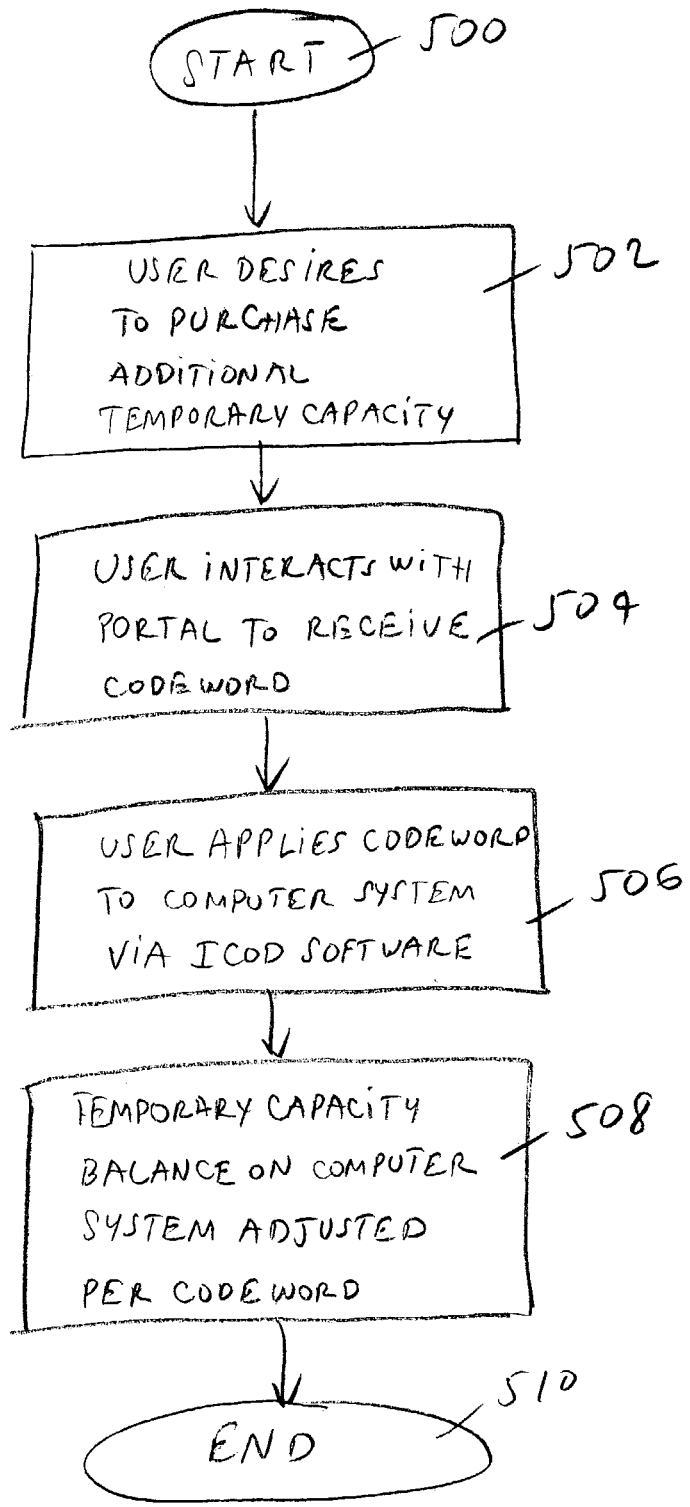
FIG. 5 shows, in accordance with one embodiment of the invention, the steps for purchasing and/or replenishing the temporary capacity balance.

FIG. 5 shows, in accordance with one embodiment of the invention, the steps for purchasing and/or replenishing the temporary capacity balance. In step 502, the user realizes that he wishes to purchase additional temporary capacity. In step 504, the user may interact with the vendor's portal to receive a codeword which the user may then apply to his computer system to increase the temporary capacity balance. Generally speaking, the user may be required to enter identification information regarding the ICOD computer system, the amount of additional temporary capacity desired, the payment information, and like. Preferably, the codeword furnished by the portal encodes information that at least identifies the user's computer system and the amount of temporary capacity granted.

Once the temporary codeword is received, the user may apply the temporary codeword to the computer system (506) using the software on the user's computer system. In the context of an ICOD computer system, the user may input the codeword into the ICOD software agent, for example. The application of the codeword increases the temporary capacity balance (508). As mentioned earlier, if the temporary capacity balance is negative prior to the application of the codeword, the updated temporary capacity balance is the sum of the previous negative balance and any temporary capacity units granted by the codeword.

As can be appreciated from the foregoing, the invention advantageously offers the temporary capacity feature and provides accountability for ICOD component usage without requiring the implementation of an email infrastructure or network connectivity on the user's ICOD computer system. If the user wishes to obtain data regarding the temporary capacity usage, the user may obtain such data directly from his ICOD computer system in a timely manner without having to request the data from the vendor. If the temporary capacity balance falls below a certain threshold, notifications and/or warnings may be sent directly from the user's computer system to the user, and may escalate in severity as necessary to encourage the user to take actions to maintain an adequate temporary capacity availability to support the number of activated components and/or to obtain components under an acquired right basis. If necessary, the fact that the temporary capacity balance is kept on the user's ICOD computer system facilitates enforcement by the ICOD software agent, thereby preventing abuse by users.

While this invention has been described in terms of several preferred embodiments, there are alterations, permutations, and equivalents which fall within the scope of this invention. For example, although the example herein employs CPUs as exemplary ICOD components, an ICOD component may represent any software and/or hardware component and/or subsystem that can be activated and inactivated to modify the computing capability of a computer system. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for activating a set of previously inactive components in a computer system, comprising:

receiving a request for activating said set of previously inactive components;

ascertaining whether there exists a first right for activating said set of previously inactive components;

if said first right exists, activating said set of previously inactive components in accordance with said first right;

if there is no first right for activating said previously inactive component, ascertaining whether there exists temporary capacity availability adequate to support said activating said set of previously inactive components, said temporary capacity availability being tracked at said computer system and representing a duration that a component having the same type as components in said set of previously inactive components can be activated in the absence of said first right for activating said set of previously inactive components; and if said temporary capacity availability adequate to support said activating said set of previously inactive components exists, activating said set of previously inactive components.

2. The method of claim 1 wherein said first right represents an acquired right.

3. The method of claim 2 wherein said first right is represented by an expected inactive component variable, said expected inactive component variable representing the number of inactive components having the same type as said component in said set of inactive components that should be present in said computer system to be in compliance with said first right.

4. The method of claim 3 wherein said temporary capacity availability is increased by an application of a codeword to said computer system, said temporary capacity availability being deemed adequate to support said activating said set of previously inactive components if said temporary capacity availability is greater than or is equal to a product of a number of components in said set of previously inactive components and a periodic time value, said periodic time value representing a time period of an inventory cycle conducted by software in said computer system to update said temporary capacity availability.

5. The method of claim 4 wherein said codeword is obtained from one of a seller, a servicing entity, and a manufacturer of said computer system through a telecommunication network.

6. The method of claim 5 wherein said telecommunication network is an Internet network.

7. The method of claim 4 wherein said codeword is obtained from a vendor of said computer system.

8. The method of claim 7 wherein said codeword is obtained through an Internet website associated with said vendor.

9. The method of claim 4 further comprising sending a notification from said computer system to a user when said temporary capacity availability reaches a certain threshold.

10. The method of claim 4 further comprising sending status information from said computer system to a user, said status information including at least one of a current temporary capacity balance, a current temporary capacity consumption rate, and a projected temporary capacity expiration time.

11. The method of claim 4 further comprising using software in said computer system to configure, when said temporary capacity availability reaches a predefined threshold, said set of previously inactive components to deactivate.

12. The method of claim 11 wherein said set of previously inactive components is configured to deactivate when said computer system undergoes system reboot.

13. The method of claim 11 wherein said set of previously inactive components is configured to deactivate when said temporary capacity availability reaches said predefined threshold.

14. The method of claim 1 wherein said set of previously inactive components is a set of CPUs.

15. The method of claim 1 wherein said set of previously inactive components includes a quantity of memory.

16. The method of claim 1 wherein said set of previously inactive components includes an I/O device.

17. The method of claim 1 wherein said computer system is a partitionable computer system.

18. The method of claim 1 wherein said set of previously inactive components is one of computer software and computer software capability.

19. The method of claim 1 wherein said set of previously inactive components is a subset of said computer system.

20. The method of claim 1 further comprising adjusting said temporary capacity availability if said set of previously inactive components is activated, said temporary capacity availability is adjusted by an adjustment value that is equal to a product of a number of components in said set of previously inactive components and a periodic time value, said periodic time value representing a time period of an inventory cycle conducted by software in said computer system to update said temporary capacity availability.

21. An article of manufacture comprising a program storage medium having computer readable codes embodied therein, said computer readable codes being configured for activating a set of previously inactive components in a computer system, comprising:

computer readable codes for receiving a request for activating said set of previously inactive components;

computer readable codes for ascertaining whether there exists a first right for activating said set of previously inactive components;

computer readable codes for activating said set of previously inactive components in accordance with said first right if said first right exists;

computer readable codes for ascertaining, if there is no first right for activating said previously inactive component, whether there exists temporary capacity availability adequate to support said activating said set of previously inactive components, said temporary capacity availability being tracked at said computer system and representing a duration that a component having the same type as components in said set of previously inactive components can be activated in the absence of said first right for activating said set of previously inactive components; and computer readable codes for activating said set of previously inactive components if said temporary capacity availability adequate to support said activating said set of previously inactive components exists.

22. The article of manufacture of claim 21 wherein said first right represents an acquired right.

23. The-article of manufacture of claim 22 wherein said first right is represented by an expected inactive component variable, said expected inactive component variable representing the number of inactive components having the same type as said component in said set of inactive components that should be present in said computer system to be in compliance with said first right.

24. The article of manufacture of claim 23 wherein said temporary capacity availability is increased by an application of a codeword to said computer system, said temporary capacity availability being deemed adequate to support said activating said set of previously inactive components if said temporary capacity availability is greater than or is equal to a product of a number of components in said set of previously inactive components and a periodic time value, said periodic time value representing a time period of an inventory cycle conducted by software in said computer system to update said temporary capacity availability.

25. The article of manufacture of claim 24 wherein said codeword is obtained from one of a seller, a servicing entity, and a manufacturer of said computer system through a telecommunication network.

26. The article of manufacture of claim 25 wherein said telecommunication network is an Internet network.

27. The article of manufacture of claim 24 wherein said codeword is obtained from a vendor of said computer system.

28. The article of manufacture of claim 27 wherein said codeword is obtained through an Internet website associated with said vendor.

29. The article of manufacture of claim 24 further comprising computer readable codes for sending a notification from said computer system to a user when said temporary capacity availability reaches a certain threshold.

30. The article of manufacture of claim 24 further comprising computer readable codes for sending status information from said computer system to a user, said status information including at least one of a current temporary capacity balance, a current temporary capacity consumption rate, and a projected temporary capacity expiration time.

31. The article of manufacture of claim 24 further comprising computer readable codes for using software in said computer system to configure, when said temporary capacity availability reaches a predetermined threshold, said set of previously inactive components to deactivate.

32. The article of manufacture of claim 31 wherein said set of previously inactive components is configured to deactivate when said computer system undergoes system reboot.

33. The article of manufacture of claim 31 wherein said set of previously inactive components is configured to deactivate when said temporary capacity availability reaches said predefined threshold.

34. The article of manufacture of claim 21 wherein said set of previously inactive components is a set of CPUs.

35. The article of manufacture of claim 21 wherein said set of previously inactive components includes a quantity of memory.

36. The article of manufacture of claim 21 wherein said set of previously inactive components includes an I/O device.

37. The article of manufacture of claim 21 wherein computer system is a partitionable computer system.

38. The article of manufacture of claim 21 wherein said set of previously inactive components is one of computer software and computer software capability.

39. The method of claim 21 wherein said set of previously inactive components is a subset of said computer system.

40. The article of manufacture of claim 21 further comprising computer readable codes for adjusting said temporary capacity availability if said set of previously inactive components is activated, said temporary capacity availability is adjusted by an adjustment value that is equal to a product of a number of components in said set of previously inactive components and a periodic time value, said periodic time value representing a time period of an inventory cycle conducted by software in said computer system to update said temporary capacity availability.

41. A method for enabling a computer system to allow a user to activate a previously inactive component in said computer system, including providing computer readable codes, which are embodied in a computer readable medium, for installation on said computer system, said computer readable codes, after being installed on said computer system, enable said computer system to receive a request for activating said previously inactive component and to ascertain whether there exists an acquired right for activating said previously inactive component, said computer readable codes, after being installed on said computer system, further enabling said computer system to ascertain, if there is no acquired right to activate said previously inactive component, whether there exists temporary capacity to support said activating said previously inactive component and to activate said previously inactive component if there exists temporary capacity to support said activating said previously inactive component.

42. The method of claim 41 wherein said previously inactive component is a CPU.

43. The method of claim 41 wherein said previously inactive component is a quantity of memory.

44. The method of claim 41 wherein said computer readable codes, after being installed on said computer system, further enables said computer system to receive a codeword and to increase said temporary capacity responsive to an amount of temporary capacity granted by said codeword, a value of said amount of temporary capacity granted by said codeword being encoded in said codeword.

45. The method of claim 41 wherein said previously inactive component is a software component.

* * * * *

UNITED STATES PATENT AND TRADEMARK OFFICE
CERTIFICATE OF CORRECTION

| | | |
|---|---|---|
| PATENT NO. | : 7,146,496 B2 | Page 1 of 1 |
| APPLICATION NO. | : 10/350660 | |
| DATED | : December 5, 2006 | |
| INVENTOR(S) | : Edgar I. Circenis et al. | |

It is certified that error appears in the above-identified patent and that said Letters Patent is hereby corrected as shown below:

In column 14, line 50, in Claim 23, delete "The-article" and insert -- The article --, therefor.

In column 15, line 26, in Claim 31, delete "predetermined" and insert -- predefined --, therefor.

Signed and Sealed this

Twenty-fifth Day of November, 2008

JON W. DUDAS
*Director of the United States Patent and Trademark Office*